US007609668B1

(12) United States Patent
Smith (10) Patent No.: US 7,609,668 B1
(45) Date of Patent: Oct. 27, 2009

(54) DISTRIBUTION OF PACKETS TO FOREIGN AGENTS USING MULTICAST PROTOCOLS

(75) Inventor: Malcolm M Smith, Morrisville, NC (US)

(73) Assignee: Cisco Technology, Inc., San Jose, CA (US)

( * ) Notice: Subject to any disclaimer, the term of this patent is extended or adjusted under 35 U.S.C. 154(b) by 1902 days.

(21) Appl. No.: 09/752,876

(22) Filed: Dec. 28, 2000

(51) Int. Cl.
*H04W 4/00* (2006.01)
*H04W 36/00* (2006.01)
*G06F 15/173* (2006.01)

(52) U.S. Cl. ................ 370/328; 455/436; 709/238

(58) Field of Classification Search ............ 370/390, 370/432, 331, 332; 455/422, 436, 437, 442, 455/458, 525
See application file for complete search history.

(56) References Cited

U.S. PATENT DOCUMENTS

| | | | | |
|---|---|---|---|---|
| 5,164,958 A * | 11/1992 | Omura | ................... | 375/140 |
| 5,175,867 A * | 12/1992 | Wejke et al. | ................ | 455/439 |
| 5,319,795 A * | 6/1994 | Hamabe et al. | ............. | 455/451 |
| 5,396,541 A * | 3/1995 | Farwell et al. | ............. | 455/403 |
| 5,509,035 A * | 4/1996 | Teidemann et al. | ......... | 375/356 |
| 5,572,528 A | 11/1996 | Shuen | ..................... | 370/85.13 |
| 5,825,759 A * | 10/1998 | Liu | ........................... | 370/331 |
| 6,070,075 A * | 5/2000 | Kim | ........................... | 455/437 |
| 6,240,089 B1 * | 5/2001 | Okanoue et al. | ........... | 370/390 |
| 6,430,698 B1 * | 8/2002 | Khalil et al. | ................... | 714/4 |
| 6,473,411 B1 * | 10/2002 | Kumaki et al. | ............. | 370/331 |
| 6,487,605 B1 | 11/2002 | Leung | ........................ | 709/245 |
| 6,522,880 B1 * | 2/2003 | Verma et al. | ................ | 455/436 |
| 6,665,537 B1 | 12/2003 | Lioy | .......................... | 455/435 |
| 6,691,227 B1 * | 2/2004 | Neves et al. | ................ | 713/162 |
| 6,804,221 B1 * | 10/2004 | Magret et al. | .............. | 370/338 |
| 6,973,057 B1 * | 12/2005 | Forslow | ...................... | 370/328 |
| 6,988,146 B1 * | 1/2006 | Magret et al. | .............. | 709/238 |
| 2001/0036834 A1 * | 11/2001 | Das et al. | .................... | 455/458 |
| 2002/0069278 A1 * | 6/2002 | Forslow | ...................... | 709/225 |

OTHER PUBLICATIONS

U.S. Appl. No. 60/186,910.*

* cited by examiner

*Primary Examiner*—Ricky Ngo
*Assistant Examiner*—Clemence Han
(74) *Attorney, Agent, or Firm*—Baker Botts L.L.P.

(57) ABSTRACT

A wireless communications system includes a mobile unit having a home network and a home agent in the home network. The system also includes foreign networks with foreign agents that provide wireless services to the mobile unit when the mobile unit travels outside of the service area of the home network. Foreign agents providing or likely to provide services for the mobile unit receive information for communication to the mobile unit by registering for a multicast group associated with the mobile unit. The home agent distributes information for communication to the mobile unit by encapsulating the information in multicast packets and communicating these packets for reception by the foreign agents registered for the multicast group.

24 Claims, 2 Drawing Sheets

DISTRIBUTION OF PACKETS TO FOREIGN AGENTS USING MULTICAST PROTOCOLS

TECHNICAL FIELD OF THE INVENTION

The present invention relates generally to wireless communications systems and more particularly to distribution of packets to foreign agents using multicast protocols.

BACKGROUND OF THE INVENTION

Internet protocol (IP) networks route packets based on network and subnet identifiers encoded in each packet. Because early IP networks could easily be divided into networks and subnets based on geographic location of equipment and because IP networks developed before widespread deployment of wireless equipment, little or no attention was given to problems associated with moving IP devices. Due to the nature of IP, a device may not attach to a network other than its home network and still receive packets. That is, routing protocols, firewalls, and other protocols aimed at error and fraud prevention work together to prevent a packet from being delivered to a device not connected to its home network.

However, wireless communications systems employ a technique known as "tunneling" that allows mobile devices to attach to foreign networks and yet still receive packets. For a mobile device roaming in a foreign network, a home agent in the home network of the mobile device acts as a point of delivery for all packets addressed to the mobile device. The mobile device registers with a foreign agent in the foreign network, which permits the home agent to "tunnel" packets to the foreign agent. To tunnel a packet, the home agent creates a new packet addressed to the foreign agent that contains the original packet. The foreign agent, upon receiving the tunneled packet, may then extract the original packet and communicate that packet to the mobile device. However, while tunnels allow a mobile device to receive packets in one foreign network, communications sessions of mobile devices often suffer data loss and/or disconnection when handoff occurs between two different foreign networks.

SUMMARY OF THE INVENTION

In accordance with the present invention, techniques for distribution of packets to foreign agents using multicast protocols are provided which substantially eliminate or reduce disadvantages and problems associated with previous techniques. In a particular embodiment, the present invention satisfies a need for efficient distribution of packets to one or more foreign networks communicating with a mobile unit.

According to one embodiment of the present invention, a system for distributing packets for communication to a mobile unit includes a mobile unit having a device identifier and an internet protocol (IP) address comprising a first subnet identifier, with the mobile unit roaming in a foreign network having a second subnet identifier. The system also includes a mobility manager that determines a multicast address for the mobile unit based on the device identifier, receives multicast address requests that include the device identifier, and communicates the multicast address responsive to the multicast address requests. The system also includes a foreign agent in the foreign network. The foreign agent detects the mobile unit, determines the device identifier for the mobile unit, communicates a request including the device identifier to the mobility manager, receives the multicast address from the mobility manager, and registers for a multicast group identified by the multicast address. The system also includes a home agent that receives IP packets addressed to the mobile unit, determines the multicast address associated with the mobile unit, encapsulates the IP packets as payloads for multicast packets addressed to the multicast address, and communicates the multicast packets for receipt by devices registered for the multicast group using a packet network.

In accordance with another embodiment of the present invention, a method for registering to receive packets determines a device identifier for a mobile unit, the mobile unit having an internet protocol (IP) address with a subnet identifier for a remote network. The method communicates a request for a multicast address associated with the mobile unit, with the request including the device identifier. The method also receives the multicast address and registers for a multicast group identified by the multicast address.

Various embodiments of the invention provide a number of technical advantages. These techniques permit wireless communications systems to use packet switched elements to distribute information for communication to mobile units. This use of packet switched elements may enable more efficient use of resources compared to circuit switched elements used in many wireless communications systems. Moreover, multicast protocols provide efficient use of packet switched resources for distributing packets to multiple destinations. That is, multicast protocols allow a packet network to distribute copies of packets to multiple recipients using a delivery tree that branches out among routers to efficiently deliver copies. This can provide an efficient use of resources since the routers of a packet network may collaborate to form a delivery tree having the fewest number of branches for communicating copies of packets to each member of a multicast group.

In addition, these techniques support virtually seamless movement of mobile units between multiple, distinct, autonomous networks. That is, multiple foreign agents may register for a multicast group associated with a mobile unit. This facilitates handoff of the mobile unit between the foreign networks serviced by the foreign agents. For example, in code division multiple access (CDMA) systems, these techniques facilitate handoff between foreign networks by distributing information for communication to the mobile unit to each foreign network. This allows base transceiver stations in multiple foreign networks to simultaneously communicate information for reception by a mobile unit.

Other technical advantages of the present invention will be readily apparent to one skilled in the art from the following figures, descriptions, and claims.

BRIEF DESCRIPTION OF THE DRAWINGS

For a more complete understanding of the present invention and its advantages, reference is now made to the following descriptions, taken in conjunction with the accompanying drawings, in which.

DETAILED DESCRIPTION OF THE DRAWINGS

Figure 1:
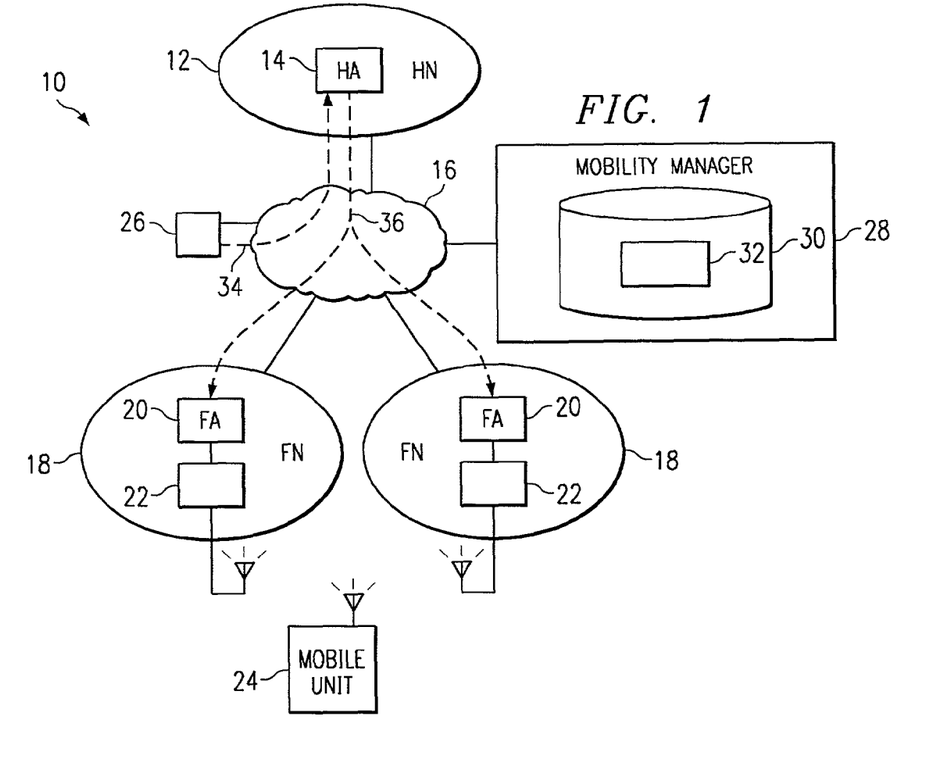
FIG. 1 illustrates a communications system for communicating packets having information for a mobile unit from a home agent to foreign agents using multicast protocols.

FIG. 1 illustrates a communications system, indicated generally at 10, having a home network (HN) 12, which includes a home agent (HA) 14, coupled using a communications network 16 to foreign networks (FNs) 18, which include foreign agents (FAs) 20 and base transceiver stations (BTSs) 22. System 10 also includes a mobile unit 24 that is registered for wireless services in home network 12. In general, elements within system 10 use multicast protocols to facilitate communications sessions between mobile unit 24 and remote devices, such as communications device 26, while mobile unit 24 roams in areas serviced by foreign networks 18. More specifically, while mobile unit 24 roams in foreign networks 18, home agent 14 receives information for communication to mobile unit 24 and distributes this information to foreign agents 20 using multicast packets.

Mobile unit 24 represents any suitable wireless device that provides wireless communications for voice, data, video, signaling, control, telemetry, and/or other transmissions using any suitable wireless communications protocols by establishing wireless links with stations 22. Mobile unit 24 may be an analog or digital cellular telephone, personal digital assistant (PDA), pager, or other suitable wireless device providing wireless services for subscribers. Wireless links represent any channel or channels established between devices for the persistent, periodic, or sporadic communication of information using any suitable wireless communications protocols. Thus, stations 22 represent hardware and/or software supporting wireless links with mobile units 24.

Home network 12 represents any collection and arrangement of communications devices, such as a radio access network (RAN), supporting wireless communications for a particular service area. In this illustration, home network 12 represents the home with respect to mobile unit 24. Thus, in this example, home network 12 represents the network in which mobile unit 24 has subscribed to receive wireless services. According to a particular embodiment, mobile unit 24 subscribes to IP data services from home network 12. In this embodiment, home network 12 includes devices having addresses that correspond to the network or subnet address of the IP address assigned to mobile unit 24. For example, home agent 14 and mobile unit 24 each have assigned internet protocol (IP) addresses, with the network or subnet portions of these addresses being identical.

Foreign networks 18 represent any collection and arrangement of communications devices, such as RANs, that provide wireless communications services to a particular service area. In this illustration, foreign network 18 represents networks foreign with respect to mobile unit 24. Thus, foreign networks 18 represent wireless networks other than home network 12. Foreign networks 18 may include any number of stations 22 for establishing wireless links with wireless communications devices such as mobile unit 24. Foreign networks 18 provide wireless services for mobile unit 24 when mobile unit 24 travels in areas serviced by stations 22. According to a particular embodiment, mobile unit 24 subscribes to IP data services from home network 12. In this embodiment, foreign networks 18 include devices having different network or subnet addresses than mobile unit 24.

Home agent 14 and foreign agents 20 represent communications devices, such as routers, for receiving and transmitting information and for processing multicast packets having information for communication to mobile unit 24. While mobile unit 24 roams in foreign networks 18, home agent 14 acts as a central point of contact for information for communication to mobile unit 24. For example, home agent 14 may receive packets addressed to an IP address assigned to mobile unit 24. To deliver these packets to mobile unit 24, home agent 14 reforms these packets as multicast packets addressed to a multicast address associated with mobile unit 24. Upon communicating these multicast packets, communications network 16 and foreign networks 18 distribute copies of the multicast packets to foreign agents 20 communicating with or likely to communicate with mobile unit 24. Thus, foreign agents 20 act as local points of contact in foreign networks 18 for mobile unit 24. Foreign agents 20 receive the multicast packets containing information for mobile unit 24 from home agent 14 and direct the communication of information from these multicast packets to mobile unit 24 by stations 22. This process allows mobile unit 24 to receive packets when roaming in foreign networks 18. However, system 10 contemplates home network 12 using these techniques to distribute any suitable information for communication to mobile unit 24 to foreign agents 20.

As shown in this example, communications between home network 12 and foreign networks 18 take place using communications network 16. Communications network 16 may include any collection and arrangement of hardware and/or software for communicating information between multiple devices. For example, communications network 16 may be one or a collection of components associated with the public switched telephone network (PSTN), local area networks (LANs), wide area networks (WANs), a global computer network such as the Internet, or any other communications equipment suitable for providing wireless and/or wireline communications.

To facilitate the distribution of information from home agent 14 to foreign agents 20 using multicast protocols, system 10 includes a mobility manager 28, which manages multicast addresses for mobile devices such as mobile unit 24. Mobility manager 28 maintains information mapping mobile devices to multicast addresses, with this information stored using memory 30. Memory 30 represents any collection and arrangement of volatile or non-volatile, local or remote devices suitable for storing data, for example, random access memory (RAM) devices, read only memory (ROM) devices, magnetic storage devices, optical storage devices, or any other suitable data storage devices.

Mobility manager 28 uses memory 30 to store address mapping information 32. Mapping information 32 includes information that allows mobility manager 28 to determine a multicast address associated with a particular mobile device. For example, mapping information 32 may include a table having mobile units 24 indexed by device identifiers and/or IP addresses that associates mobile units 24 with multicast addresses. Thus, according to a particular embodiment, a multicast address associated with mobile unit 24 may be determined from mapping information 32 based on a device identifier or an IP address for mobile unit 24. A device identifier represents any information for identifying mobile unit 24, such as a mobile identification number (MIN), an equipment serial number (ESN), or other suitable identifier. However, system 10 contemplates selected mobile units 24 having associated multicast addresses. For example, mapping information 32 may indicate multicast addresses only for those mobile units 24 currently roaming in foreign networks 18 and carrying on communications sessions.

Therefore, mapping information 32 permits mobility manager 28 to determine a multicast address assigned to a mobile device based on some identifier for that mobile device, so long as the mobile device has an associated multicast address. Using mapping information 32, mobility manager 28 responds to requests from remote devices for multicast addresses associated with mobile devices such as mobile unit 24. These requests include a device identifier for the mobile device, which mobility manager 28 uses to determine the associated multicast address or the IP address assigned to the mobile device. Mobility manager 28 may then communicate the multicast address and/or the IP address to the remote device in response to the request. However, if the request identifies a mobile device without an associated multicast address, mobility manager 28 may determine an available multicast address, associate this multicast address with the mobile device identified in the request, and then communicate the assigned multicast address to the remote device in response to the request.

Alternatively, mobility manager 28 may determine that an associated multicast address for the mobile device is currently not necessary and indicate this condition to the requesting device. In addition, for system security, system 10 contemplates mobility manager 28 using any suitable authentication process for verifying the validity of requests from remote devices. For example, for foreign agents 20 requesting a multicast address associated with mobile unit 24, mobility manager may authenticate foreign agents 20 to verify that foreign agents 20 have authorization to receive information for communication to mobile unit 24.

Although this figure illustrates mobility manager 28 as a separate element of system 10, other elements in system 10 may implement some or all of the functionalities of mobility manager 28. For example, agents 14 and 20 may manage multicast addresses for their local subscribers. Thus, home agent 14 may manage a multicast address for mobile unit 24 and respond to requests from remote devices requesting to obtain this multicast address. However, a distribution of the management of multicast addresses may require some coordination between the distributed elements, for example, to prevent the assignment of a single multicast address to multiple wireless devices. However, system 10 contemplates any suitable distribution or centralization of the functions of mobility manager 28.

In operation, foreign agents 20 provide wireless services to mobile unit 24 using stations 22 while mobile unit 24 remains in areas serviced by foreign networks 18. To receive information for communication to mobile unit 24, foreign agents 20 register for a multicast group associated with mobile unit 24. To register for the group, foreign agent 20 requests the multicast address associated with mobile unit 24 from mobility manager 28. This request may include, for example, a device identifier for mobile unit 24, such as a mobile identification number (MIN), equipment serial number (ESN), or other appropriate identifier. Upon receiving the multicast address from mobility manager 28, foreign agent 20 registers for the associated multicast group. At this point, foreign agent 20 receives packets addressed to the multicast address.

Home agent 14 generates these multicast packets to distribute information for communication to mobile unit 24. For example, during a communications session between mobile unit 24 and a remote device, home agent 14 receives packets with information for mobile unit 24. Mobile unit 24 reforms these packets as multicast packets addressed to the multicast address associated with mobile unit 24 and communicates these packets to foreign agents 20 that have registered for the multicast group using communications network 16. As with the operation of foreign agents 20, home agent 14 may access mobility manager 28 to determine the multicast address associated with mobile unit 24. Thus, home agent 14 may request the multicast address associated with mobile unit 24 from mobility manager 28. As previously discussed, this request may include a device identifier for mobile unit 24, such as the MIN or the IP address assigned to mobile unit 24. Home agent 14 uses the multicast address received from mobility manager 28 to generate multicast packets for distributing information to foreign agents 20 communicating with or likely to communicate with mobile unit 24.

For example, consider a packet-based communications session between mobile unit 24 and device 26. To communicate packets to mobile unit 24, device 26 generates packets addressed to an IP address assigned to mobile unit 24. However, because IP networks view the IP address of mobile unit 24 as indicating a device physically within home network 12, these packets from device 26 may not be directly delivered to foreign agents 20. Rather, as indicated at 34, home agent 14 receives these packets from communications device 26. Home agent 14 then reforms these packets as multicast packets addressed to the multicast address associated with mobile unit 24. For example, to reform the packets received, home agent 14 may encapsulate received packets as payloads of multicast packets addressed to the multicast address associated with mobile unit 24. However, system 10 contemplates home agent 14 parsing, combining, separating, or otherwise modifying information received to form multicast packets encapsulating this information.

Home agent 14 communicates these multicast packets using communications network 16, which, as indicated at 36, distributes the multicast packets to foreign agents 20 that have registered for the multicast group. Thus, home agent 14 may use multicast packets to distribute information for mobile unit 24 to one or more foreign agents 20 communicating with or likely to communicate with mobile unit 24. This allows foreign agents 20 to support soft or hard handoffs between base transceiver stations 22. For example, in a CDMA system, foreign agents 20 in multiple, autonomous foreign networks 18 can provide handoff of mobile unit 24 between base transceiver stations 22. However, system 10 contemplates using these techniques for supporting handoff of wireless devices between foreign networks 18 communicating using any suitable wireless communications protocols.

Figure 2:
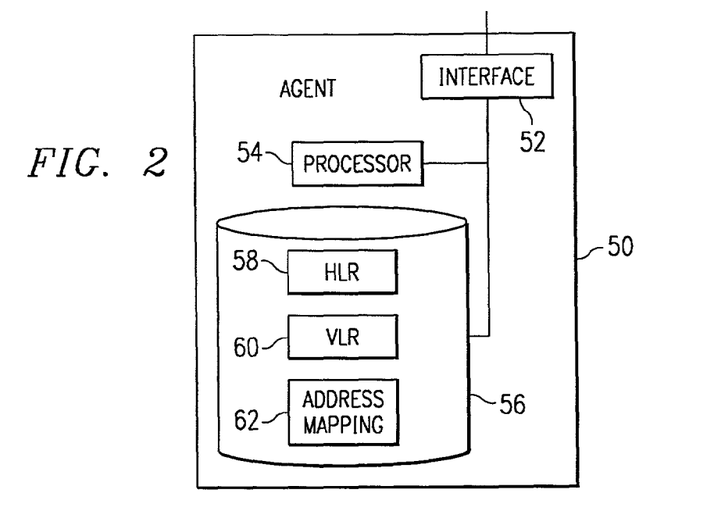
FIG. 2 is a block diagram illustrating an agent from the system, the agent operating as a home agent for local subscribers and as a foreign agent for out-of-area subscribers.

FIG. 2 illustrates functional elements of an exemplary agent 50 having an interface 52, a processor 54, and a memory 56. In general, agent 50 functions as home agent 14 for local wireless subscribers and functions as foreign agent 20 when providing wireless services to mobile devices having remote home networks. For example, selected mobile devices support IP data communications. Agent 50 may have an IP address that includes a network or subnet identifier. For mobile devices having IP addresses with identical network or subnet identifiers, agent 50 acts as home agent 14. For mobile devices with IP addresses having different network or subnet identifiers than agent 50, agent 50 acts as foreign agent 20.

Processor 54 controls the management and operation of agent 50 by accessing information stored using memory 56 and using interface 52 to communicate with remote devices. As with memory 30, memory 56 represents any suitable local or remote data storage devices. Interface 52 couples agent 50 to other devices, such as devices in a local network, base transceiver stations 22, communications network 16, and other communications equipment. For example, when agent 50 operates as home agent 14 for a mobile device, agent 50 uses interface 52 to receive information for the mobile device and to communicate multicast packets containing this information to foreign agents 18. When operating as foreign agent 20 for a mobile device, agent 50 uses interface 52 to receive multicast packets addressed to the multicast address associated with the mobile device and to communicate with stations 22 to effect the communication of information from the multicast packets to the mobile device.

Memory 56 maintains information for use by agent 50 in identifying mobile devices and in using multicast protocols to distribute information between home agents 14 and foreign agents 20. In this example, memory 56 includes a home location register (HLR) 58, a visitor location register (VLR) 60, and address mapping information 62. HLR 58 and VLR 60 contain information for determining home network 12 for mobile devices. Address mapping information 62 contains information identifying mobile devices and multicast addresses associated with these mobile devices. For example, when acting as home agent 14 for a mobile device, agent 50 may store an entry in address mapping information 62 identifying the mobile device and listing an associated multicast address. However, while this example includes specific information maintained by memory 56, system 10 contemplates agent 50 maintaining any suitable information facilitating the operation of agent 50.

Agent 50 acts as home agent 14 for local mobile devices, which, for example, includes those devices with IP addresses having network or subnet identifiers identical to that of the IP address of agent 50. When a local mobile device establishes a communication session using foreign network 18, agent 50 provides for distribution of packets using multicast protocols to foreign networks 18 communicating with the local mobile device. For distribution of packets using multicast protocols, agent 50 determines a multicast address associated with the mobile device. For example, agent 50 may request the multicast address associated with the mobile device from mobility manager 28.

Agent 50 may request the multicast address at any suitable time, for example, upon determining that a local mobile device is in foreign network 18, when a local mobile device attempts to establish a communications session from foreign network 18, or when a local mobile device transitions a communications session into foreign network 18. Moreover, a multicast address associated with a mobile device may be valid for a specific period of time. For example, a multicast address associated with a mobile device may be valid for one or more communications sessions, may be valid so long as the mobile device remains outside of its home network 12, may be permanently assigned, or may vary in accordance with other criteria. During a communications session, agent 50 uses the multicast address for a local mobile device to distribute packets to foreign agents 18 communicating with or likely to communicate with the local mobile device.

While servicing a communications session for a local mobile device, agent 50 receives information for delivery to the local mobile device, such as packets addressed to an IP address assigned to the local mobile device. According to a particular embodiment, agent 50 encapsulates received packets as payloads for multicast packets addressed to the multicast address associated with the local mobile device. This, in effect, places a "wrapper" around a received packet to permit distribution of the packet to foreign agents 20. Alternatively, agent 50 may change the address of the received packets to readdress the packets to the multicast address. In readdressing received packets, agent 50 may leave other information, such as quality of service and other header information, unchanged. Moreover, agent 50 may aggregate received packets, parse received packets, or otherwise modify received packets when reforming these packets as multicast packets. In addition, agent 50 may receive information in forms other than packets and reform the information into multicast packets.

Agent 50 communicates multicast packets using communications network 16, which distributes the multicast packets to foreign agents 20 registered for the multicast group. By using multicast protocols, agent 50 need not maintain a list of foreign agents 20 communicating with or likely to communicate with a local mobile device. Rather, multicast protocols provide for distribution of the multicast packets to foreign agents 20 registered for the multicast group. Therefore, foreign agents 20, mobility manager 28, or other suitable elements of system 10 may determine those foreign agents 20 that should register or be registered for membership in a multicast group.

While agent 50 acts as home agent 14 for local mobile devices, agent 50 acts as foreign agent 20 for foreign mobile devices, which includes, for example, mobile devices having IP addresses with network or subnet identifiers different than that of the IP address for agent 50. In general, when operating as foreign agent 28, agent 50 registers for multicast groups associated with foreign mobile devices, receives multicast packets containing information for communication to these foreign mobile devices, and directs the communication of this information to the foreign mobile devices.

To detect mobile devices, agent 50 may monitor any appropriate signals, cellular triggers, or communications, and agent 50 may use information such as radio link quality determinations for wireless links between stations 22 and mobile devices and other suitable information. In detecting mobile devices, agent 50 attempts to identify those devices that are or will likely use agent 50 to service wireless communications sessions. For example, agent 50 may detect a mobile device by determining that a signal strength for signals received from the mobile device have exceeded some threshold or may detect a mobile device by receiving a registration request from the mobile device.

Upon detecting the mobile device, agent 50 determines a device identifier for the mobile device. For example, agent 50 may receive the device identifier from mobile unit 24 as part of a request to register received from mobile unit 24. With the device identifier, agent 50 determines whether the device represents a foreign mobile device by accessing information such as HLR 58 and VLR 60. In addition, agent 50 may determine whether the mobile device has an associated IP address. For example, the mobile device may have a registration for mobile IP services that indicates a remote home network 12.

If the mobile device has a remote home network 12, agent 50 may determine a multicast address assigned to the foreign mobile device and register for the multicast group identified by the multicast address. To determine the multicast address, agent 50 may, for example, request the multicast address from mobility manager 28. As a part of this request, agent 50 may include the device identifier for the mobile device. Upon receiving the multicast address, agent 50 registers for the multicast group identified by the multicast address. This permits agent 50 to receive multicast packets containing information for communication to the foreign mobile device.

As a member of the multicast group associated with the foreign mobile device, agent 50 may provide wireless services for the foreign mobile device. For example, during a communications session, agent 50 receives multicast packets containing information for communication to the foreign mobile device. Agent 50 extracts the information from these multicast packets and directs the communication of this information to the foreign mobile device by stations 22. For example, if home agent 14 encapsulates packets addressed to the IP address of the mobile device within multicast packets, agent 50 may simply extract the encapsulated packets and communicate these extracted packets to the mobile device using stations 22. Alternatively, if home agent 14 readdresses packets by changing the IP address of the mobile device to a multicast address, agent 50 may replace the multicast address with the IP address for the mobile device. However, system 10 contemplates agent 50 using any suitable techniques to retrieve information from the multicast packets for communication to a foreign mobile device. More specifically, the techniques used by agent 50 in extracting this information will correspond to the techniques used by home agents 14 in generating the multicast packets.

While this example includes specific functional elements for agent 50, system 10 contemplates agent 50 containing any collection and arrangement of elements. Moreover, system 10 contemplates implementing the functionalities of agent 50 using any suitable distribution or separation of functionalities and components among devices at one or more locations. For example, stations 22 may implement some or all of the functionalities of agent 50. In addition, system 10 contemplates implementing each of the functional elements within agent 50 using any suitable combination and arrangement of hardware and/or software and implementing any of the functionalities using a computer program stored on a computer readable medium.

Figure 3:
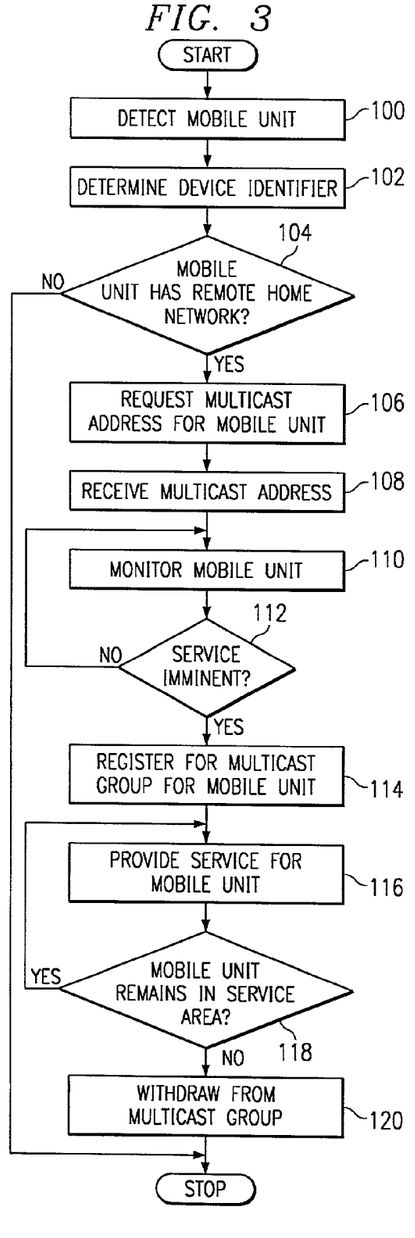
FIG. 3 is a flowchart of a method for registering for a multicast group associated with a mobile unit and for providing wireless service for the mobile unit.

FIG. 3 is a flowchart illustrating the operation of foreign agent 20 in providing wireless services for mobile unit 24. Foreign agent 20 detects mobile unit 24 at step 100 and determines a device identifier for mobile unit 24 at step 102. As previously discussed, foreign agent 20 may use any suitable techniques to detect mobile unit 24. For example, foreign agent 20 may monitor radio link quality information for mobile devices in or close to the service area of foreign network 18. In addition, as a part of detecting mobile unit 24, foreign agent 20 determines a device identifier for mobile unit 24. For example, as previously discussed, the device identifier may be included in a registration request received from mobile unit 24, foreign agent 20 may request a device identifier from mobile unit 24, or foreign agent 20 may receive the device identifier from another element, such as station 22.

After detecting mobile unit 24 and determining a device identifier, foreign agent 20 determines whether mobile unit 24 has a remote home network 12 at step 104. If not, mobile unit 24 represents a local mobile device and foreign agent 20 may process wireless services for mobile unit 24 without using multicast protocols. However, if mobile unit 24 has a remote home network 12, foreign agent 20 requests a multicast address for mobile unit 24 at step 106. For example, foreign agent 20 may contact mobility manager 28 and identify mobile unit 24 using the device identifier. Foreign agent 20 receives the multicast address at step 108.

Because foreign agent 20 may detect mobile unit 24 in advance of providing wireless services to mobile unit 24, foreign agent 20 may monitor mobile unit 24 at step 110 and determine whether service is imminent for mobile unit 24 at step 112. Thus, foreign agent 20 may determine whether mobile unit 24 and station 22 are likely to establish a wireless link before registering for the multicast group for mobile unit 24. If foreign agent determines that service is imminent for mobile unit 24, foreign agent 20 registers for the multicast group for mobile unit 24 at step 114. This permits foreign network 18 to begin receiving packets for mobile unit 24 in advance of providing services for communications sessions of mobile unit 24. The in-advance receipt of packets enables seamless handoff of mobile unit 24 to stations 22 in foreign network 18.

While registered for the multicast group, foreign agent 20 provides service for mobile unit 24 at step 116. This includes receiving multicast packets containing information for communication to mobile unit 24, extracting the information from these multicast packets, and communicating the information to mobile unit 24 using station 22. This allows multiple foreign agents 20 registered for the multicast group to support handoff of mobile unit 24 between multiple, distinct, autonomous networks. While providing service for mobile unit 24, foreign agent 20 monitors whether mobile unit 24 remains in the service area of foreign network 18 at step 118. If so, foreign agent 20 continues providing service for mobile unit 24. However, if mobile unit 24 moves outside of the service area, foreign agent 20 may withdraw from the multicast group associated with mobile unit 24 at step 120.

While this flowchart illustrates an exemplary method of operation, system 10 contemplates foreign agent 20 using any suitable techniques for detecting mobile units 24 and registering for multicast groups associated with these mobile units 24 to provide wireless services. Thus, many of the steps in this flowchart may take place simultaneously and/or in different orders than as shown. Moreover, system 10 contemplates foreign agent 20 using methods with additional steps, fewer steps, and/or different steps, so long as the methods remain appropriate for providing wireless services to mobile units 24 using multicast protocols.

Figure 4:
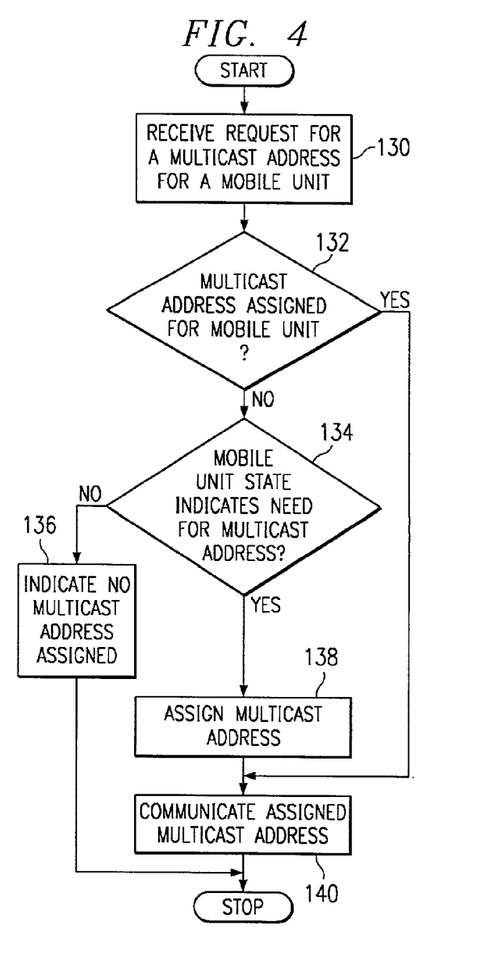
FIG. 4 is a flowchart illustrating a method for assigning and managing multicast addresses for mobile units.

FIG. 4 is a flowchart illustrating exemplary operation of mobility manager 28 in processing requests for multicast addresses associated with mobile units 24. Mobility manager 28 receives a request for a multicast address for mobile unit 24 at step 130 and determines whether this particular mobile unit 24 has an assigned multicast address at step 132. If so, mobility manager 28 communicates the assigned multicast address to the requesting device at step 140.

However, if no multicast address is assigned for this mobile unit 24, mobility manager 28 may determine whether the current state of mobile unit 24 indicates a need for a multicast address. For example, mobility manager 28 may determine whether mobile unit 24 currently has an established communications session. If not, mobile unit 24 may not need an assigned multicast address until establishing a communications session. However, system 10 contemplates mobility manager 28 using any suitable criteria for determining when to assign multicast addresses to mobile units 24. If mobility manager 28 determines that mobile unit 24 does not currently need a multicast address, mobility manager 28 indicates to the requesting device that no multicast address is assigned at step 136. However, if mobile unit 24 requires a multicast address, mobility manager 28 assigns a multicast address to mobile unit 24 at step 138 and communicates the assigned multicast address to the requesting device at step 140.

While this flowchart illustrates an exemplary method of operation, system 10 contemplates mobility manager 28 using any suitable techniques for processing requests for multicast addresses associated with mobile units 24. Thus, many of the steps in this flowchart may take place simultaneously and/or in different orders than as shown. In addition, system 10 contemplates mobility manager 28 using methods with additional steps, fewer steps, and different steps, so long as the methods remain appropriate for processing requests for multicast addresses and assigning these multicast addresses. For example, mobility manager 28 may perform security functions to authenticate devices requesting multicast addresses for mobile unit 24.

Although the present invention has been described in several embodiments, a myriad of changes and modifications may be suggested to one skilled in the art, and it is intended that the present invention encompass such changes and modifications as fall within the scope of the present appended claims.

What is claimed is:

1. A system for distributing packets for communication to a mobile unit comprising:
   a mobile unit having a device identifier and an internet protocol (IP) address comprising a first subnet identifier, the mobile unit roaming in a foreign network having a second subnet identifier;
   a mobility manager operable to determine a multicast address for the mobile unit based on the device identifier, to receive multicast address requests that include the device identifier, and to communicate the multicast address responsive to the multicast address requests;
   a plurality of foreign agents in the foreign network, the foreign agents operable to detect the mobile unit, to determine the device identifier for the mobile unit, to communicate a request including the device identifier to the mobility manager, to receive the multicast address from the mobility manager, and to register for a multicast group identified by the multicast address; and
   a home agent operable to receive IP packets addressed to the mobile unit, to determine the multicast address associated with the mobile unit, to encapsulate the IP packets as payloads for multicast packets addressed to the multicast address, and to communicate the multicast packets for receipt by said plurality of foreign agents registered for the multicast group using a packet network, wherein the home agent determines the multicast address by communicating a request including the IP address of the mobile unit to the mobility manager and receiving the multicast address from the mobility manager responsive to the request.

2. The system of claim 1, wherein the device identifier is at least one of a mobile identification number (MIN) for the mobile unit and an equipment serial number (ESN) for the mobile unit.

3. The system of claim 1, wherein the foreign agent is further operable to receive the multicast packets from the packet network, to extract the IP packets from the multicast packets, and to communicate the IP packets to the mobile unit.

4. The system of claim 1, wherein the foreign agent is further operable to detect the mobile unit by determining that a signal strength for signals received from the mobile unit have exceeded a threshold.

5. A method for registering to receive packets comprising:
   determining, by a plurality of foreign agents, a device identifier for a mobile unit, the mobile unit having an internet protocol (IP) address comprising a subnet identifier for a remote network;
   communicating, by the plurality of foreign agents to a mobility manager, a request for a multicast address associated with the mobile unit, the request including the device identifier;
   receiving, by the plurality of foreign agents from said mobility manager, the multicast address;
   registering, by the plurality of foreign agents, for a multicast group identified by the multicast address; and
   receiving, by the plurality of receiving, by the plurality of foreign agents from a home agent, multicast packets addressed to the multicast address, wherein the multicast packets contain information for communication to the mobile unit, wherein the home agent determines the multicast address by communicating a request including the IP address of the mobile unit to the mobility manager and receiving the multicast address from the mobility manager responsive to the request.

6. The method of claim 5, wherein the information in the multicast packets comprises IP packets addressed to the IP address for the mobile unit.

7. The method of claim 5, wherein the information in the multicast packets comprises voice information.

8. The method of claim 5, wherein each of the foreign agents receiving the multicast packets communicates the information from the multicast packets to facilitate handoff of the mobile unit.

9. The method of claim 5, wherein the device identifier is at least one of a mobile identification number (MIN) for the mobile unit and an equipment serial number (ESN) for the mobile unit.

10. The method of claim 5, further comprising determining that signal strength for signals received from the mobile unit have dropped below a threshold and, in response to the determination, withdrawing from the multicast group.

11. An apparatus for providing communications services for communications sessions of a mobile unit associated with a foreign network, the apparatus comprising:
   an interface operable to couple to a communications network; and
   a processor operable to determine, by a plurality of foreign agents, a device identifier for the mobile unit, the mobile unit having an internet protocol (IP) address comprising a subnet identifier for the remote network, the processor further operable to communicate, by the plurality of foreign agents to a mobility manager, a request for a multicast address associated with the mobile unit, the request including the device identifier using the interface, to receive, by the plurality of foreign agents from said mobility manager, the multicast address using the interface, and to register, by the plurality of foreign agents, for a multicast group identified by the multicast address, wherein the multicast group comprises the plurality of foreign agents, wherein the interface is further operable to receive, by the plurality of foreign agents from a home agent, multicast packets addressed to the multicast address, wherein the multicast packets contain information for communication to the mobile unit, wherein the home agent determines the multicast address by communicating a request including the IP address of the mobile unit to the mobility manager and receiving the multicast address from the mobility manager responsive to the request.

12. The apparatus of claim 11, wherein the information in the multicast packets comprises IP packets addressed to the IP address for the mobile unit.

13. The apparatus of claim 11, wherein the information in the multicast packets comprises voice information.

14. The apparatus of claim 11, wherein each of the foreign agents receiving the multicast packets communicates the information from the multicast packets to facilitate handoff of the mobile unit.

15. The apparatus of claim 11, wherein the device identifier is at least one of a mobile identification number (MIN) for the mobile unit and an equipment serial number (ESN) for the mobile unit.

16. The apparatus of claim 11, wherein the processor is further operable to determine that signal strength for signals received from the mobile unit have dropped below a threshold and, in response to the determination, to withdraw from the muiticast group.

17. An apparatus for providing communications services for communications sessions of a mobile unit associated with a foreign network, the apparatus comprising:
- means for determining, by a plurality of foreign agents, a device identifier for the mobile unit, the mobile unit having an internet protocol (IP) address comprising a subnet identifier for the remote network;
- means for communicating, by the plurality of foreign agents to a mobility manager, a request for a multicast address associated with the mobile unit, the request including the device identifier;
- means for receiving, by the plurality of foreign agents from said mobility manager, the multicast address;
- means for registering, by the plurality of foreign agents, for a multicast group identified by the multicast address, wherein the multicast group comprises the plurality of foreign agents; and means for receiving, by the plurality of foreign agents from a home agent, multicast packets addressed to the multicast address, wherein the multicast packets contain information for communication to the mobile unit, wherein the home agent determines the multicast address by communicating a request including the IP address of the mobile unit to the mobility manager and receiving the multicast address from the mobility manager responsive to the request.

18. The apparatus of claim 17, further comprising means for determining that signal strength for signals received from the mobile unit have dropped below a threshold and means for, in response to the determination, withdrawing from the multicast group.

19. A computer program for registering to receive packets, the computer program stored on a computer readable medium and operable to:
- determine, by a plurality of foreign agents, a device identifier for a mobile unit, the mobile unit having an internet protocol (IP) address comprising a subnet identifier for a remote network;
- communicate, by the plurality of foreign agents to a mobility manager, a request for a multicast address associated with the mobile unit, the request including the device identifier;
- receive, by the plurality of foreign agents from said mobility manager, the multicast address;
- register, by the plurality of foreign agents, for a multicast group identified by the multicast address, wherein the multicast group comprises the plurality of foreign agents; and receive, by the plurality of foreign agents from a home agent, multicast packets addressed to the multicast address, wherein the multicast packets contain information for communication to the mobile unit, wherein the home agent determines the multicast address by communicating a request including the IP address of the mobile unit to the mobility manager and receiving the multicast address from the mobility manager responsive to the request.

20. The computer program of claim 19, wherein the information in the multicast packets comprises IP packets addressed to the IP address for the mobile unit.

21. The computer program of claim 19, wherein the information in the multicast packets comprises voice information.

22. The computer program of claim 19, wherein each of the foreign agents receiving the multicast packets communicates the information from the multicast packets to facilitate handoff of the mobile unit.

23. The computer program of claim 19, wherein the device identifier is at least one of a mobile identification number (MIN) for the mobile unit and an equipment serial number (ESN) for the mobile unit.

24. The computer program of claim 19, further operable to determine that signal strength for signals received from the mobile unit have dropped below a threshold and, in response to the determination, to withdraw from the multicast group.

* * * * *

UNITED STATES PATENT AND TRADEMARK OFFICE
CERTIFICATE OF CORRECTION

PATENT NO. : 7,609,668 B1  Page 1 of 1
APPLICATION NO. : 09/752876
DATED : October 27, 2009
INVENTOR(S) : Malcolm M Smith It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 2312 days.

Signed and Sealed this

Twelfth Day of October, 2010

David J. Kappos
*Director of the United States Patent and Trademark Office*